United States Patent
Wang et al.

(10) Patent No.: US 6,321,023 B1
(45) Date of Patent: Nov. 20, 2001

(54) SERIAL IMAGER FOR BIREFRINGENT DETECTOR ACOUSTIC IMAGING SYSTEMS

(76) Inventors: Honghui Wang; Jaswinder S. Sandhu; Witold J. Popek, all of 716 S. Milwaukee Ave., Wheeling, IL (US) 60090

( * ) Notice: Subject to any disclaimer, the term of this patent is extended or adjusted under 35 U.S.C. 154(b) by 0 days.

(21) Appl. No.: 09/597,649

(22) Filed: Jun. 20, 2000

(51) Int. Cl.$^7$ .................. G02F 1/11; G02F 1/07; G02F 1/33; G02B 26/08

(52) U.S. Cl. .................. 385/285; 359/205; 359/256; 359/305; 359/308

(58) Field of Search .................. 359/205, 256, 359/305, 308, 285

(56) References Cited

U.S. PATENT DOCUMENTS

| | | |
|---|---|---|
| 3,597,043 | 8/1971 | Dreyer . |
| 3,831,434 | 8/1974 | Greguss . |
| 4,338,821 | 7/1982 | Dion . |
| 4,379,408 | 4/1983 | Sandhu . |
| 4,393,712 | 7/1983 | Sandhu . |
| 4,492,107 | 1/1985 | Sandhu . |
| 4,506,550 | 3/1985 | Sandhu . |
| 4,530,242 | 7/1985 | Sandhu . |
| 4,651,567 | 3/1987 | Sandhu . |
| 4,652,086 | 3/1987 | Sandhu . |
| 4,679,436 | 7/1987 | Sandhu . |
| 4,788,865 | 12/1988 | Sandhu . |
| 4,905,202 | 2/1990 | Robillard . |
| 5,796,003 | 7/1998 | Sandhu . |
| 6,049,411 | 4/2000 | Sandhu . |

*Primary Examiner*—Georgia Epps
*Assistant Examiner*—Michael A. Lucas
(74) *Attorney, Agent, or Firm*—Don Moyer

(57) ABSTRACT

A computer-readable signal bearing medium (10) has components (11, 21, 31) which act via a data processor (86) in an imaging system having an acoustic energy source (81) and a birefringent detector (84, 70) to record first data (14) from a first portion (61) of an object (60), the first portion attenuating first acoustic energy (12) at least part way to a first attenuation maximum (13, 43) along a first acousto-optic response (41) of the birefringent detector; to record second data (24) from a second portion (62) of the object, the second portion attenuating second acoustic energy (22) at least part way to a second attenuation maximum (23, 53) along a second acousto-optic response (51) of the birefringent detector; combines the data (32), and outputs a result.

7 Claims, 4 Drawing Sheets

FIG. 3

| VARIATION | ITEM | TIME | POWER | E FIELD |
|---|---|---|---|---|
| I | 10 DB IMAGE | 0 TO T10 | P20 | --- |
| | 20 DB IMAGE | T10 TO T20 | P20 | --- |
| | COMBINE | --- | --- | --- |
| IIA | 10 DB IMAGE | --- | P10 | --- |
| | 20 DB IMAGE | --- | P20 | --- |
| | COMBINE | --- | --- | --- |
| IIB | 10 DB IMAGE | --- | P10 | --- |
| | RESET | --- | --- | E |
| | 20 DB IMAGE | --- | P20 | --- |
| | COMBINE | --- | --- | --- |
| III | 20 DB IMAGE | --- | P20 | --- |
| | RESET | --- | --- | E |
| | 10 DB IMAGE | --- | P10 | --- |
| | COMBINE | --- | --- | --- |
| IVA | 10 DB IMAGE | --- | P20 | E10 |
| | 20 DB IMAGE | --- | P20 | --- |
| | COMBINE | --- | --- | --- |
| IVB | 10 DB IMAGE | --- | P20 | E10 |
| | RESET | --- | --- | E |
| | 20 DB IMAGE | --- | P20 | --- |
| | COMBINE | --- | --- | --- |
| V | 20 DB IMAGE | --- | P20 | --- |
| | RESET | --- | --- | E |
| | 10 DB IMAGE | --- | P20 | E10 |
| | COMBINE | --- | --- | --- |

SERIAL IMAGER FOR BIREFRINGENT DETECTOR ACOUSTIC IMAGING SYSTEMS

BACKGROUND OF THE INVENTION

The product, using parallel birefringent acousto-optic responses, combines serial images of an object.

Prior art systems—for example disclosed by Sandhu in U.S. Pat. No. 6,049,411 and in art listed there—do not suggest the product shown here.

SUMMARY OF THE INVENTION

A serial imager comprises a computer-readable signal-bearing medium acting via a data processor connected to an imaging system having a birefringent detector having a first acousto-optic response and having a second acousto-optic response to acoustic energy which is from an acoustic energy source and which has interacted with an object; comprises a first component of the medium, the first component causing recording of first data from the birefringent detector, the first data being caused by a first portion of the object attenuating first acoustic energy from the acoustic energy source along the first acousto-optic response; comprises a second component of the medium, the second component causing recording of second data from the birefringent detector, the second data being caused by a second portion of the object attenuating second acoustic energy from the acoustic energy source along the second acousto-optic response; and comprises a combination component of the medium, the combination component causing combination of the first data and the second data, and the combination component causing output of image data representing combination of the first data and the second data.

BRIEF DESCRIPTION OF THE DRAWINGS

FIG. 3 depicts imaging variations.

DESCRIPTION OF THE PREFERRED EMBODIMENTS

Figure 1:
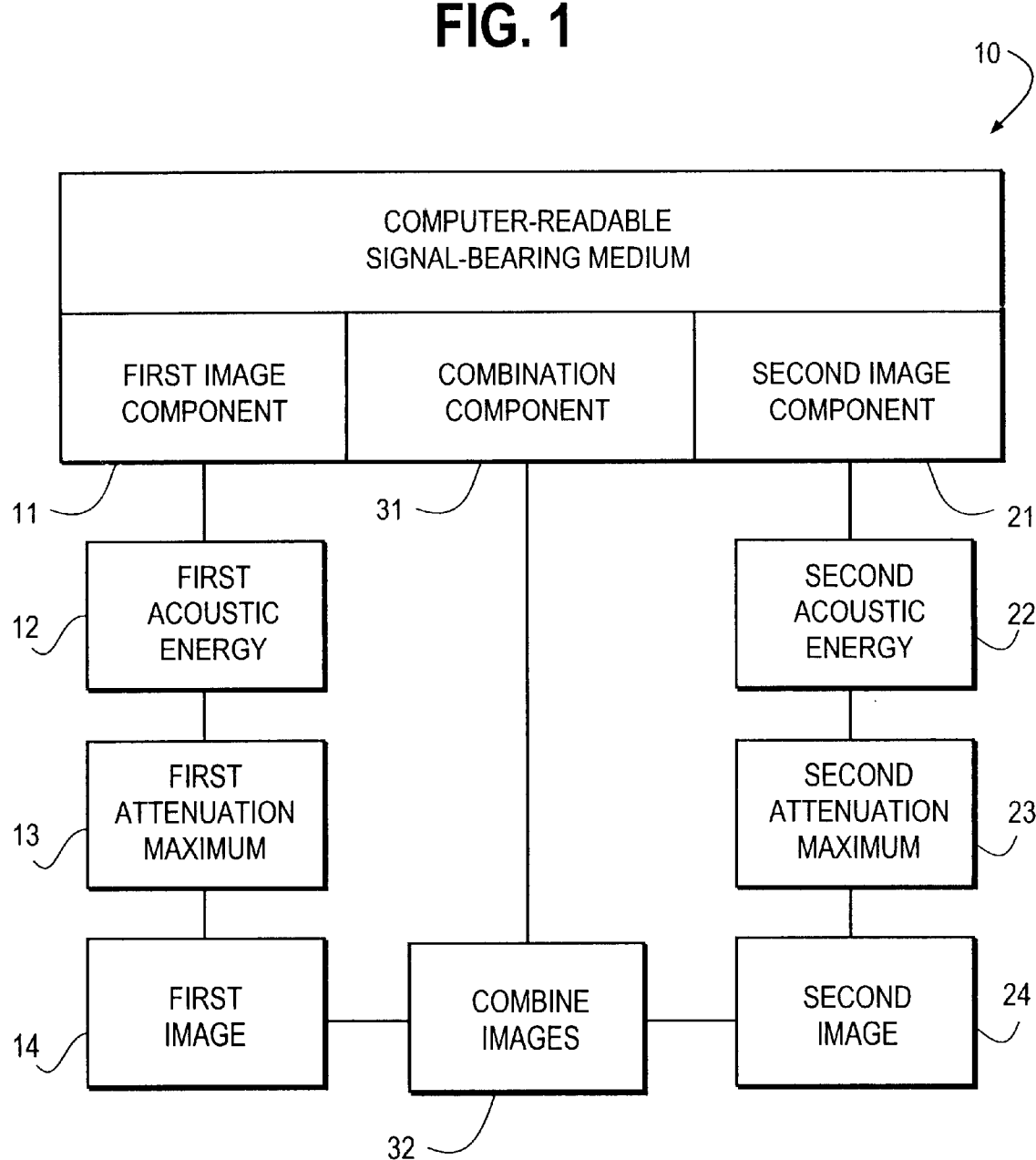
FIG. 1 depicts the imager.

A computer-readable signal-bearing medium 10 acts via a data processor connected to an imaging system having a birefringent detector with a first acousto-optic response and a second acousto-optic response to acoustic energy which is from an acoustic energy source and which has interacted with an object.

The medium 10 has a first component 11 causing recording of first data 14 from the birefringent detector; first data being caused by a first portion 61 of an object 60 attenuating first acoustic energy 12 from the acoustic energy source 81 along the first acousto-optic response at least part way to a first attenuation maximum 13.

The medium has a second component 21 causing recording of second data 24 from the birefringent detector; second data being caused by a second portion 62 of the object attenuating second acoustic energy 22 from the acoustic energy source along the second acousto-optic response at least partway to a second attenuation maximum 23.

The medium has a combination component 31 which causes combination 32 of the first data and the second data and causes output of image data representing combination of the first data and the second data.

Figure 4:
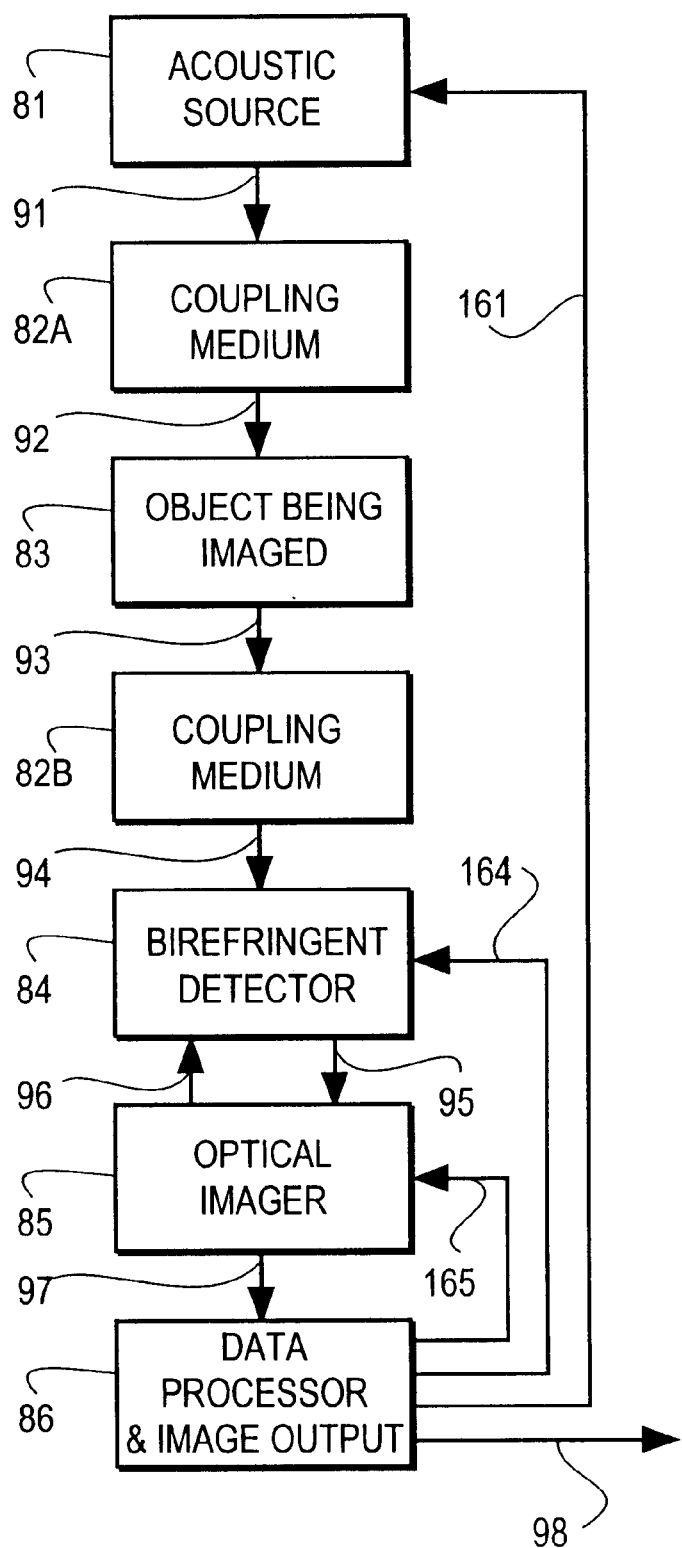
FIG. 4 depicts imaging subsystems.

In the system depicted in FIG. 4—and detailed by Sandhu in U.S. Pat. No. 6,049,411 which is incorporated herein by reference—an acoustic energy source 81 sends acoustic energy 91 via a coupling medium 82A to interact with an object 83. Acoustic energy attenuated by the object 92 travels via the coupling medium 82B to interact 94 with a birefringent detector 84.

An optical imager 85 sends light 96 to the birefringent detector, and light 95 which has interacted with the birefringent detector is imaged by the optical imager producing an image signal 97 which is input to a data processor 86 outputting an output signal 98.

The data processor can send a power signal 161 to change the power output of the acoustic energy source, can send a detector signal 164 to change the properties of the birefringent detector, and can send an imager signal 165 to change properties of the optical imager.

Figure 2:
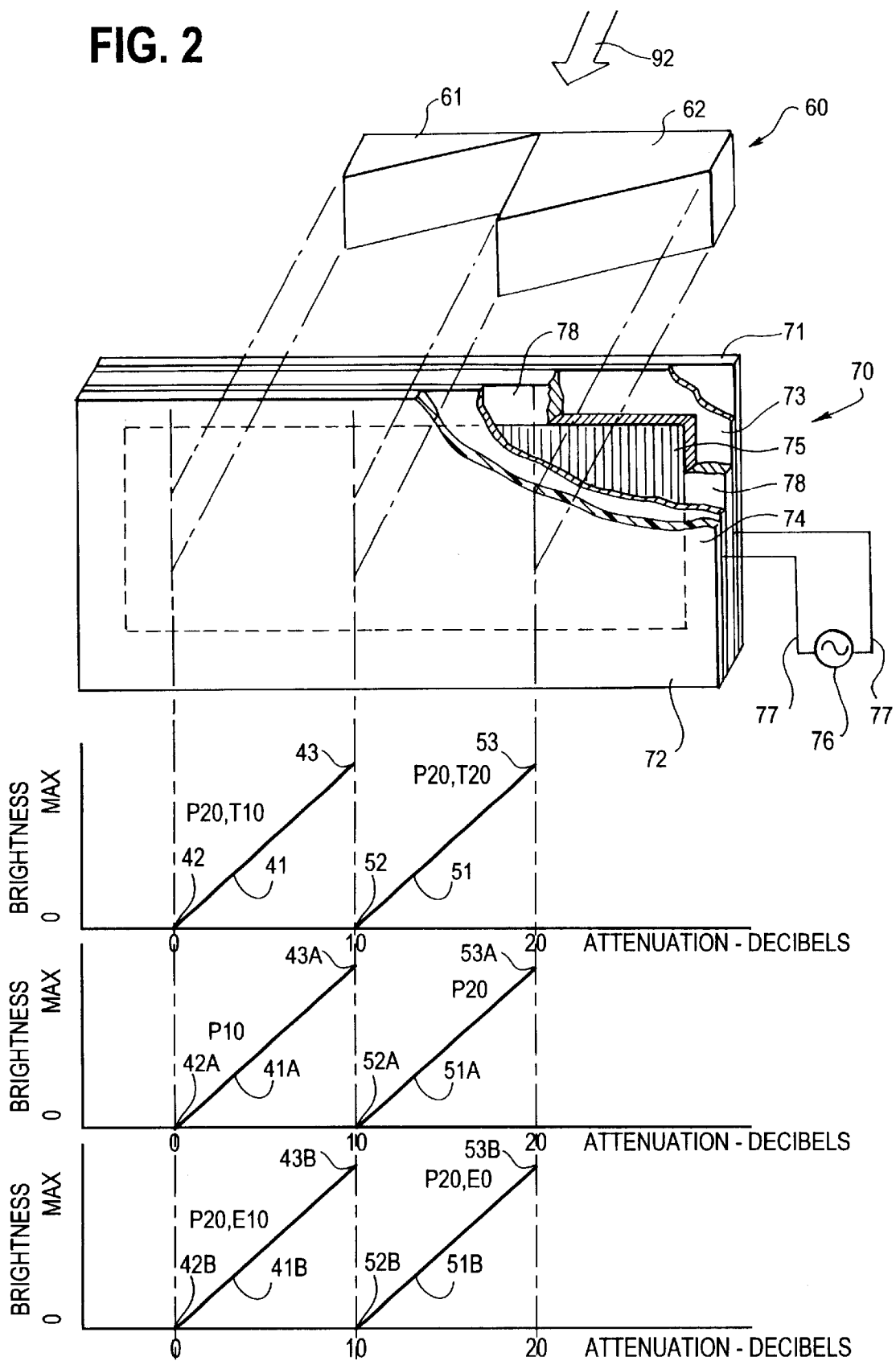
FIG. 2 depicts an object, detector, and acousto-optic responses.

An exemplar 70 of birefringent detectors having multiple acousto-optic responses (brightness a function of attenuation)—hereafter "H-detectors"—is depicted in FIG. 2. H-detectors have a proximal plate 71 proximal the object 60 and a distal plate 72 distal the object, which are sealed around their edges by a frame 78 to enclose a volume filled with a birefringent medium 75. In the exemplar the proximal plate is 0.8 millimeters, the distal plate is 1.6 millimeters, both glass, and the area inside the sealing spacer frame is 50.8 millimeters by 50.8 millimeters.

A proximal electrically conducting coating 73 on the proximal plate and a distal electrically conducting coating 74 on the distal plate are connected by electrical leads 77 to a source of electric potential 76. The electric potential can produce an electric field between the proximal and distal plates and across the birefringent medium. An oscillating potential source is used so that the birefringent medium is not transported by the field.

In the exemplar the glass plates are purchased with Indium-Tin-Oxide coatings 265 Angstroms thick. Successful imaging conditions can be obtained for coatings at least three times as thick and for potentials ranging at least between one and ten kilohertz.

In the exemplar the birefringent medium is Merck ZLI3125 and is 150 micrometers thick. While the full range of birefringent media and configurations for H-detectors which will produce imaging conditions which will allow serial images to be combined is not known, it is known that H-detectors other than the exemplar can be used.

A first portion 61 of an object 60 attenuates first acoustic energy along a first acousto-optic response 41 of an H-detector between a first attenuation threshold 42 and a first attenuation maximum 43, and first data representing the brightness of the H-detector produced thereby can be recorded.

A second portion 61 of the object attenuates second acoustic energy along a second acousto-optic response 51 between a second attenuation threshold 52 and a second attenuation maximum 53, and second data representing the brightness of the H-detector produced thereby can be recorded.

Because these acousto-optic responses are approximately parallel and because attenuation thresholds and maxima can be chosen so that these acousto-optic responses overlap, second data can be combined with first data to form an image of the object substantially equivalent to an image which would be formed by an acousto-optic response between a first attenuation threshold 42 and a second attenuation maximum 53.

Attenuation thresholds and maxima are limited by the useful portions of acousto-optic responses but otherwise are freely chosen to bracket portions of acousto-optic responses according to conditions of use of the product.

The shape of an object 60 shown in FIG. 2 is chosen to have a first portion 61 and a second portion 62 which make it easy to see relations between the acousto-optic responses and the object. The first portion is defined as an object portion which does attenuate first acoustic energy along a first acousto-optic response at least part way to a first attenuation maximum. The second portion is defined as an object portion which does attenuate second acoustic energy along a second acousto-optic response at least part way to a second attenuation maximum. The first portion and second portion can be distributed throughout the object in many disconnected parts and the principles disclosed here do not change.

It takes a time T10—about 0.1 second for the exemplar—for an H-detector to reach the first attenuation maximum and a longer time T20—typically about 1 second for the exemplar—to reach the second attenuation maximum. The first acoustic energy is the energy incident through a first time interval, and the second acoustic energy is the energy incident through the first time interval and through a second time interval. The power of the first acoustic energy and the second acoustic energy are both set to the value P20 which will cause the second portion 62 to drive the second acousto-optic response 51 to the second attenuation maximum 53, first data are recorded when the first acousto-optic response 41 is at least part way to the first attenuation maximum 43, and second data are recorded when the second acousto-optic response 51 is at least part way to the second attenuation maximum 53. This is variation I in FIG.3.

In variation IIA the power of the first acoustic energy is set to a value P10 for which the first portion 61 drives the first acousto-optic response 41A from the first attenuation threshold 42A to the first attenuation maximum 43A and first data are recorded. The second acoustic energy is set to the power P20 for which the second portion 62 drives the second acousto-optic response 51A from the second attenuation threshold 52A to the second attenuation maximum 53A and second data are recorded.

In variation IIB the source of electric potential 76 is activated to apply a resetting electric field E—typically about 45 volts peak to peak for the exemplar —across the birefringent medium to return the birefringent medium to the pre first attenuation threshold state after first data are recorded. In variation III second data are recorded as in IIB before first data are recorded as in IIB with the source of electric potential being activated to apply the resetting electric field across the birefringent medium to return the birefringent medium to the pre first attenuation threshold state after second data are recorded.

In variation I second data could be recorded before first data with the birefringent medium being returned to a pre first attenuation maximum state by the resetting electric field.

In variation IVA the first acoustic energy power is set to the value P20 which would drive the second acousto-optic response 51B to the second attenuation maximum 53B and the source of electric potential 76 is activated to apply a response electric field E10 across the birefringent medium. The response electric field—typically about 20 volts peak-to-peak for the exemplar causes the birefringent medium to respond to P20 substantially as it responds to P10. With this first acoustic energy the first portion drives the first acousto-optic response 41B from the first attenuation threshold 42B to the first attenuation maximum 43B and first data are recorded. Then the electric field is set to zero. With the second acoustic energy the second portion drives the second acousto-optic response from the second attenuation threshold 52B to the second attenuation maximum and second data are recorded.

In variation IVB the source of electric potential 76 is activated to apply a resetting electric field E across the birefringent medium to return the birefringent medium to the pre first attenuation threshold state after first data are recorded. In variation V second data are recorded as in IVB before first data are recorded as in IVB with the source of electric potential being activated to apply a resetting electric field E across the birefringent medium to return the birefringent medium to the pre first attenuation threshold state after second data are recorded.

In each case first data and second data can be recorded for attenuations along only portions of the acousto-optic responses between the attenuation thresholds and the attenuation maxima. Each of the variations can be extended to three and more serial images.

First data and second data can be combined by various techniques known in the art. Preferably combination of the data comprises subtraction of any background determined by at least one test image with no object present, comprises correcting for any variations of acousto-optic response across the detector, comprises scaling first data and second data to the scale of their share of the combined image, and comprises adding second data to first data.

Combination of data can also comprise data transformations known in the art—for example to linearize acousto-optic responses, to correct for any parallelism deviations of acousto-optic responses, and to enhance images—all depending on conditions of the use of the product.

Image data can represent combination of first and second data in various ways known in the art such as by use of image enhancement schemes and false color depictions.

The computer-readable signal-bearing medium can be a transmitted signal, a data storage medium, and a combination of a transmitted signal and a data storage medium.

A transmitted signal can be any of various point-to-point and broadcast forms of energy transmission—wireless and via wires, cables, and fibers known in the art. Parts of the signal can reside with one component of the transmitted signal, parts can reside with a second component of transmitted signal, and parts can reside with various combinations of transmitted signals.

The data storage medium can be any of various mechanical, electrical, magnetic, optical, molecular, atomic, and quantum data storage media known in the art. Parts of the computer-readable signal can reside with a data storage medium, parts can reside with a second data storage medium, parts can reside with a transmitted signal, parts can reside with a second transmitted signal, and parts can reside with various combinations of data storage media and transmitted signals.

The computer-readable signal-bearing medium acts via a data processor to cause recording of first data, recording of second data, combination of first data and second data, and outputting image data. This data processor can be a special purpose computer and can be a general purpose computer. Either computer can be stand-alone, can be part of a network, and can be stand-alone and part of a network in alternate time intervals.

First data and second data can be recorded in at least a second computerreadable signal-bearing medium, can be recorded in the medium, and can be recorded in both totally, in separate parts, and in redundant parts.

Preferably the medium acts via the data processor 86 of the imaging system, and the medium first component and the medium second component set the power of the acoustic energy source via power signal 161 and set the electric field via detector signal 164 as needed for imaging variations.

Descriptions, drawings, and referenced elements illustrating principles of the invention do not limit the invention as other equivalent elements, element configurations, and operations comprehended by principles of the invention will be obvious hereafter to persons skilled in the art.

What is claimed is:

1. A serial imager product comprising:
    a computer-readable signal-bearing medium acting via a data processor connected to an imaging system having a birefringent detector having a first acousto-optic response and having a second acousto-optic response to acoustic energy which is from an acoustic energy source and which has interacted with an object;
    a first component of the medium, the first component causing recording of first data from the birefringent detector, the first data being caused by a first portion of the object attenuating first acoustic energy along the first acousto-optic response;
    a second component of the medium, the second component causing recording of second data from the birefringent detector, the second data being caused by a second portion of the object attenuating second acoustic energy from the acoustic energy source along the second acousto-optic response; and
    a combination component of the medium, the combination component causing combination of the first data and the second data, and the combination component causing output of image data representing combination of the first data and the second data.

2. The product of claim 1 wherein the first acoustic energy is incident on the birefringent detector through a first time interval and the second acoustic energy is incident on the birefringent detector through the first time interval and through a second time interval.

3. The product of claim 1 wherein the second acoustic energy is second in time to, and is greater than, the first acoustic energy.

4. The product of claim 1 wherein a resetting electric field is applied across the birefringent detector between recording of first image data and of the second image data.

5. The product of claim 4 wherein the second acoustic energy is first in time to, and is greater than, the first acoustic energy.

6. The product of claim 1 wherein a response electric field is applied across the birefringent detector while the first portion of the object attenuates the first acoustic energy along the first acousto-optic response.

7. A serial imager product comprising:
    a computer-readable signal-bearing medium acting via a data processor connected to an imaging system having a birefringent detector having a first acousto-optic response and having a second acousto-optic response to acoustic energy which is from an acoustic energy source and which has interacted with an object;
    a first component of the medium, the first component causing recording of first data from the birefringent detector, the first data being caused by a first portion of the object attenuating first acoustic energy from the acoustic energy source along the first acousto-optic response, the first acoustic energy being incident on the birefringent detector through a first time interval;
    a second component of the medium, the second component causing recording of second data from the birefringent detector, the second data being caused by a second portion of the object attenuating second acoustic energy from the acoustic energy source along the second acousto-optic response, the second acoustic energy being incident on the birefringent detector through the first time interval and through a second time interval; and
    a combination component of the medium, the combination component causing combination of the first data and the second data, and the combination component causing output of image data representing combination of the first data and the second data.

* * * * *